(12) United States Patent
Ito et al.

(10) Patent No.: US 6,488,300 B2
(45) Date of Patent: *Dec. 3, 2002

(54) LINK TYPE FRONT SUSPENSION STRUCTURE

(75) Inventors: Shinji Ito, Saitama (JP); Toshiyuki Iwai, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/783,088

(22) Filed: Feb. 15, 2001

(65) Prior Publication Data

US 2001/0022438 A1 Sep. 20, 2001

(30) Foreign Application Priority Data

Feb. 15, 2000 (JP) ........................ 2000-036055

(51) Int. Cl.7 ............................................. B62K 21/04
(52) U.S. Cl. ...................................................... 280/276
(58) Field of Search ................................ 180/227, 219; 280/276, 274, 277, 275, 279

(56) References Cited

U.S. PATENT DOCUMENTS

| | | | | |
|---|---|---|---|---|
| 1,254,798 A | * | 1/1918 | Harley | |
| 4,775,163 A | * | 10/1988 | McGowan et al. | 280/277 |
| 5,026,083 A | * | 6/1991 | Wendorf | 280/277 |
| 5,186,274 A | * | 2/1993 | Hegman | 180/227 |
| 6,152,472 A | * | 11/2000 | Woodside | 280/277 |
| 6,155,370 A | * | 12/2000 | Iwai et al. | 180/222 |
| 6,164,675 A | * | 12/2000 | Pickering | 280/277 |

FOREIGN PATENT DOCUMENTS

| | | | |
|---|---|---|---|
| DE | 3833880 | * | 10/1988 |
| JP | 1-204884 | * | 8/1989 |

* cited by examiner

*Primary Examiner*—Avraham Lerner
(74) *Attorney, Agent, or Firm*—Birch, Stewart, Kolasch & Birch, LLP (57) ABSTRACT

To provide a link type front suspension structure that makes it difficult for a bending moment to act on a push rod conveying expansion and contraction of a front fork to a shock absorber. An upper arm rotatably bridges between an upper end of a push rod and the front fork, and the length of this upper arm is equal to the length between a linking point of a lower end section of the push rod of the axle support arm and a linking point of the arm holder, and is substantially parallel with this length. As a result, a parallelogram link is formed by the front fork, the push rod, the upper arm and part of the axle support arm.

12 Claims, 7 Drawing Sheets

PRIOR ART

LINK TYPE FRONT SUSPENSION STRUCTURE

BACKGROUND OF THE INVENTION

1. Field of the Invention

The present invention relates to a link type front suspension structure applied to a motorcycle.

2. Description of Background Art

A link type front suspension structure having a shock absorbing function not in a front fork but separately from a front fork, in which expansion and contraction of the front fork is conveyed to a shock absorber through a link mechanism, is known from the related art.

Figure 8:
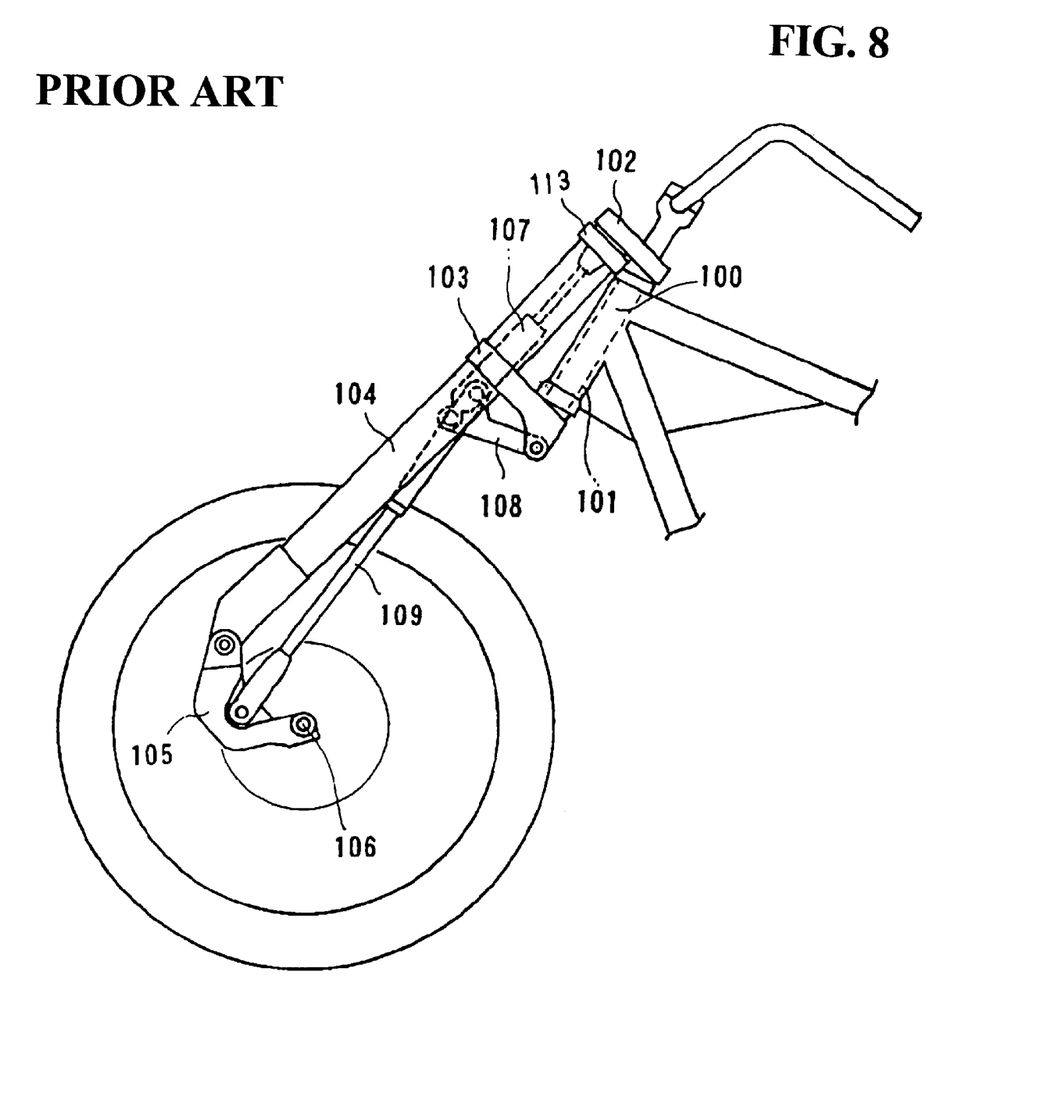
FIG. 8 is a side elevation of a link type front suspension structure of the related art.

FIG. 8 shows a link type front suspension structure of the related art.

Specifically, a steering stem 101 is rotatably attached to a head pipe 100, a top bridge 102 is provided on an upper end of this steering stem 101, a bottom bridge 103 is provided on a lower end of the steering stem 101, a front fork 104 is supported by the top bridge 102 and the bottom bridge 103, one end of an axle support arm 105 is connected to a lower end of this front fork 104, and the other end of the axle support arm is connected to an axle 106 of a front wheel.

An upper end of a shock absorber 107 is attached to a cushion upper bracket passed through the front fork 104 and arranged on a lower end of the top bridge 102, a lower end of this shock absorber 107 is attached to a cushion arm 108 having one end pivoted on the bottom bridge 103, a push rod 109 links between the cushion arm 108 and the axle support arm 105, and expansion and contraction of the front form 104 is conveyed to the shock absorber 107 through a link mechanism made up of the axle support arm 105, the push rode 109 and the cushion arm 108.

With the above described link type front suspension structure of the related art, there is great variation between the direction of expansion and contraction of the front fork and the arrangement direction of the push rod, which means that a bending moment acts on the push rod. As a result, the push rod must have a certain rigidity to take this bending moment into consideration, and this inevitably makes the push rod thicker, and increases the overall weight.

SUMMARY AND OBJECTS OF THE INVENTION

A link type front suspension unit of the present invention for solving the above problems has a steering stem rotatably attached to a head pipe, a top bridge provided on an upper end of this steering stem and a bottom bridge provided on a lower end of the steering stem, a front fork supported by the top bridge and bottom bridge, and a lower end of a shock absorber supported by a link mechanism provided on the front fork, wherein the link mechanism is a quadrilateral link mechanism comprising an upper link with one end connecting to a middle part of the front fork, an axle support arm with one end connecting to a lower end of the front fork and the other end connecting to an axle side of a front wheel, and a push rod having an upper end connecting to the other end of the upper link and a lower end connecting to the axle support arm.

With this structure, it is possible to reduce a bending moment acting on the push rod.

Preferably, a side section of the front fork pipe and the upper link are parallel to a greater extent than a pivot point of the push rod of the axle support arm. As a result, it is possible to completely do away with the bending moment acting on the push rod.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
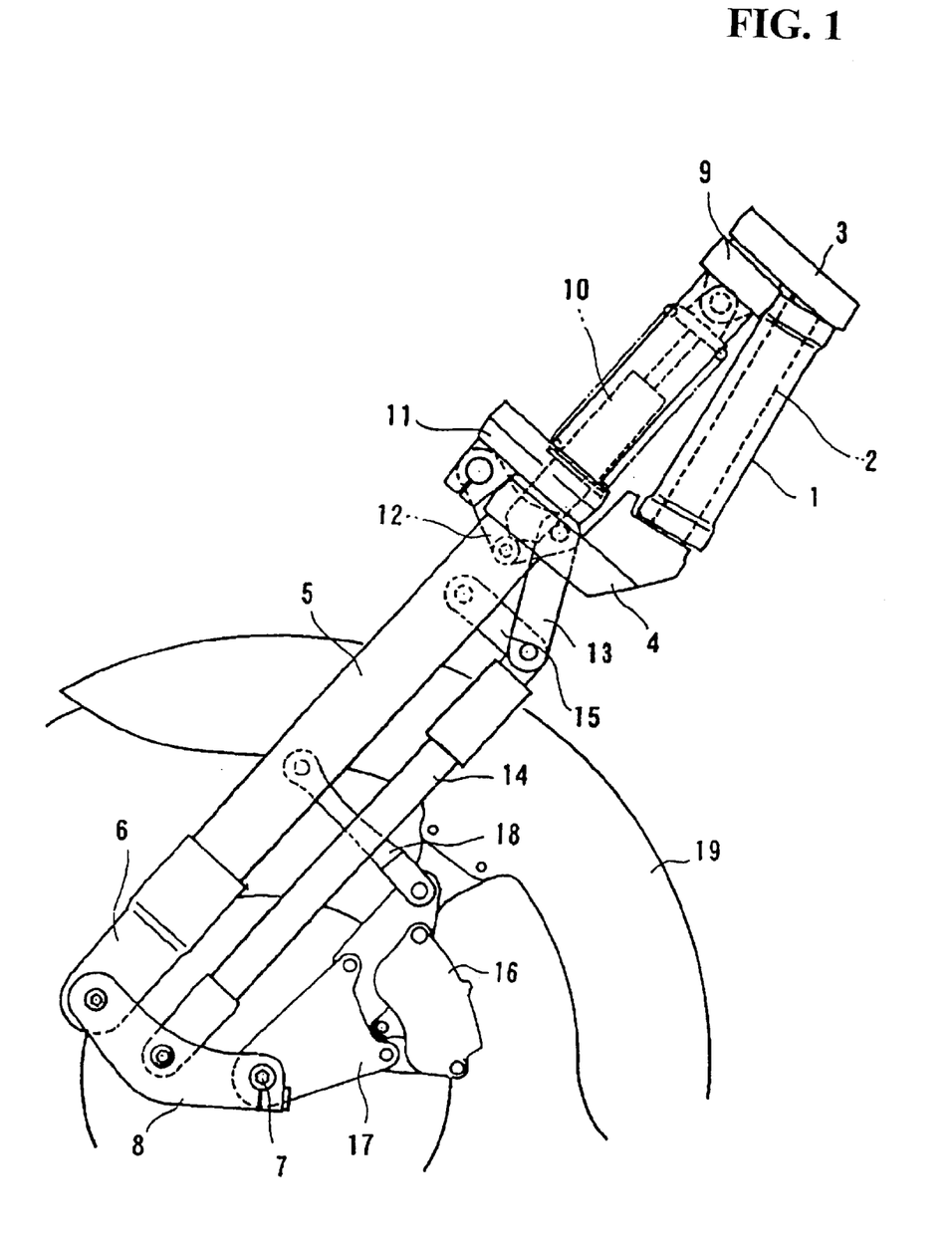
FIG. 1 is a side elevation of a link type front suspension structure to which the present invention relates.
Figure 2:
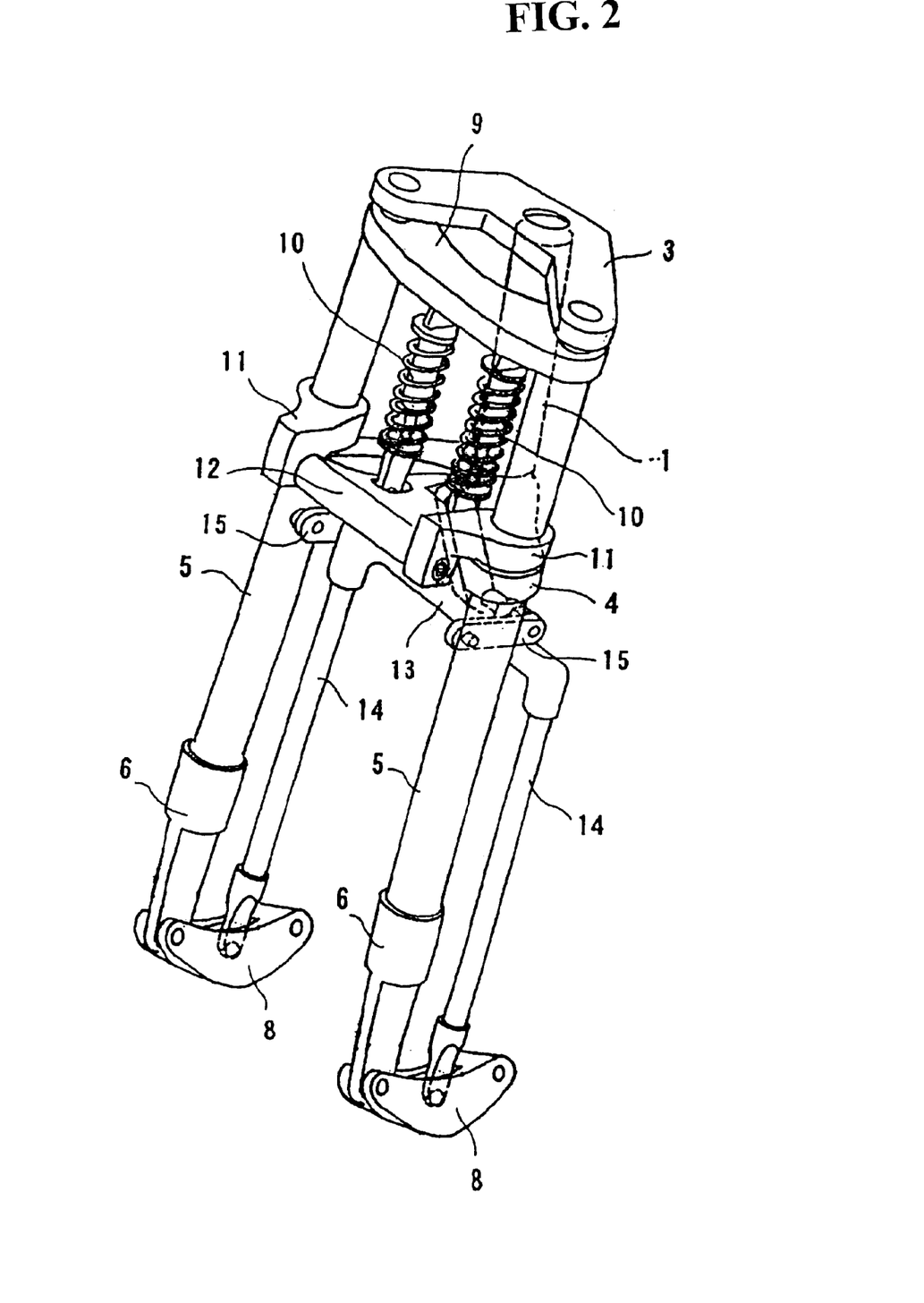
FIG. 2 is a perspective drawing of the link type front suspension structure to which the present invention relates.

Embodiments of the present invention will be described below based on the attached drawings. FIG. 1 is a side elevation of a link type front suspension structure to which the present invention relates, and FIG. 2 is a perspective drawing of the link type front suspension structure to which the present invention relates.

A steering stem 2 is inserted into this head pipe 1 so as to be capable of rotation, with a top bridge 3 being provided on an upper end of the steering stem 2 and a bottom bridge 4 being provided on a lower end of the steering stem 2, an upper part of a front fork 5 being supported by the top bridge 3 and bottom bridge 4, and a lower end of the front fork 5 being inserted into an arm holder 6.

Also, one end of an axle support arm (pivot arm) 8 is swingably attached to the axle 7 of the front wheel. The shape of this axle support arm 8 is substantially chevron shaped when viewed from the side, and the other end of the axle support arm 8 is rotatably pivoted at a lower end of the arm holder 6.

Also, an upper end of the shock absorber 10 is rotatably attached to the top bridge via an attachment stay 9, a cushion arm attachment stay 11 is fixed to the front fork 5 so as to overlap the bottom bridge 4, one end of a cushion arm 12 is swingably supported on the cushion arm attachment stay, and a lower end of the shock absorber 10 is rotatably attached to a middle section of the cushion arm 12.

An upper end of a rod shaped connecting member 13 is rotatably linked to the other end of the cushion arm 12, an upper end of a push rod 14 is rotatably linked to a lower end of the connecting member 13, and a lower end of the push rod 14 is rotatably linked to a middle section of the axle support arm 8.

An upper arm 15 rotatably bridges between an upper end of the push rod 14 and the front fork 5, and the length of this upper arm is equal to the length between a linking point of a lower end section of the push rod 14 of the axle support arm and a linking point of the arm holder 6, and is parallel to this length. As a result, a parallelogram link is formed by the front fork 5, the push rod 14, the upper arm 15 and part of the axle support arm 8.

Further, one end of an attachment stay 17 for a brake caliper 16 is attached to the front wheel axle 7, a torque link 18 is suspended between the other end of the attachment stay 17 and the front fork 5, and a fender 19 is attached to the attachment stay 17.

As described above, when a vehicle wheel moves up and down with the unevenness of the road surface, specifically, if the axle support arm 8 vibrates up and down with a linking point of the arm holder as a center, the push rod 14 constitutes part of the parallelogram link, and so it moves up and down parallel to the front fork 5 and there is no bending moment acting on the push rod 14.

In the present invention, it is not necessary to have a link that is a complete parallelogram, as long as it is almost a parallelogram. In this case also it is possible to substantially reduce a bending moment.

Figure 3:
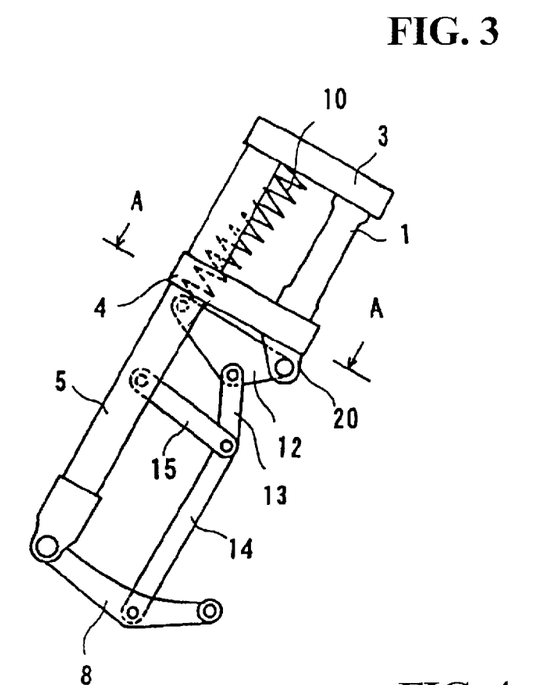
FIG. 3 is a side elevation of a link type front suspension structure to which another embodiment relates.
Figure 4:
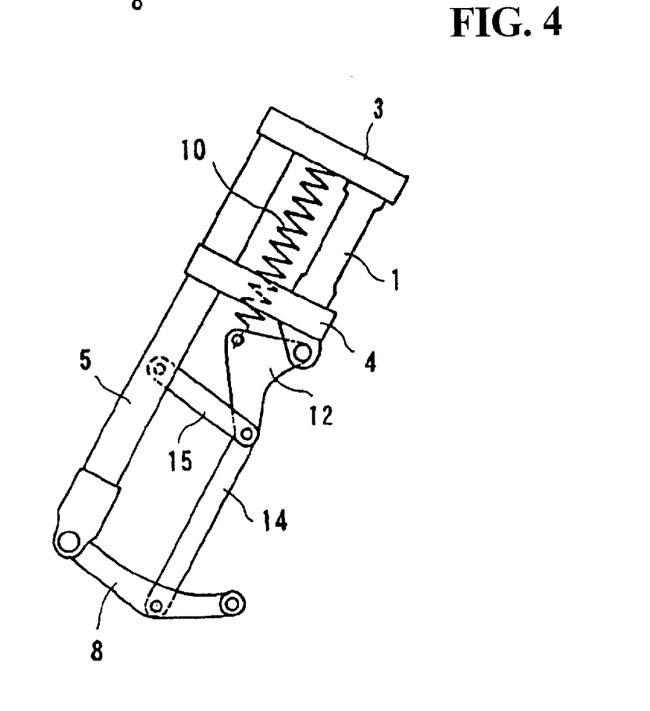
FIG. 4 is a side elevation of a link type front suspension structure to which a further embodiment relates.

FIG. 3 and FIG. 4 are side elevations showing a link type front suspension structure of other embodiments of the present invention, and the embodiment shown in FIG. 3 has a lower end of a shock absorber 10 linked to a tip end (the left end in the drawing) of a cushion arm 12 that has a triangular shape when viewed from the side, an upper end of a connecting member 13 linked to a middle section of the cushion arm 12, and a rear end of the cushion arm 12 linked to a bottom bridge 4.

Figure 7:
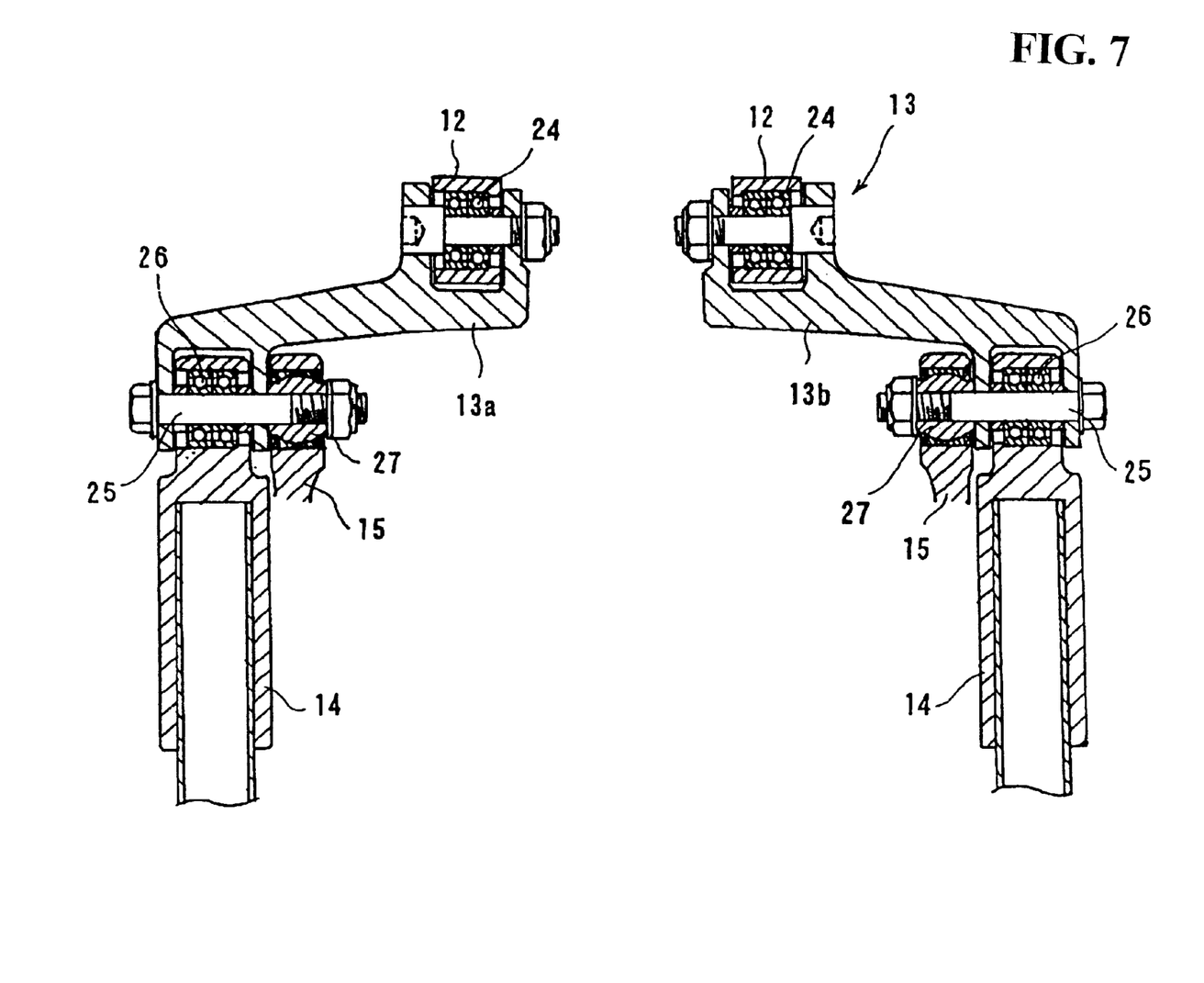
FIG. 7 is a drawing similar to FIG. 6 showing another embodiment.

The embodiment shown in FIG. 7 has a lower end of a shock absorber 10 linked to a tip end (the left end in the drawing) of a cushion arm 12 having the same triangular shape when viewed from the side as described above, an upper end of a push rod 14 linked to a lower end section of the cushion arm 12, a rear end of the cushion arm 12 linked to the bottom bridge 4, and the connecting member is omitted.

Figure 5:
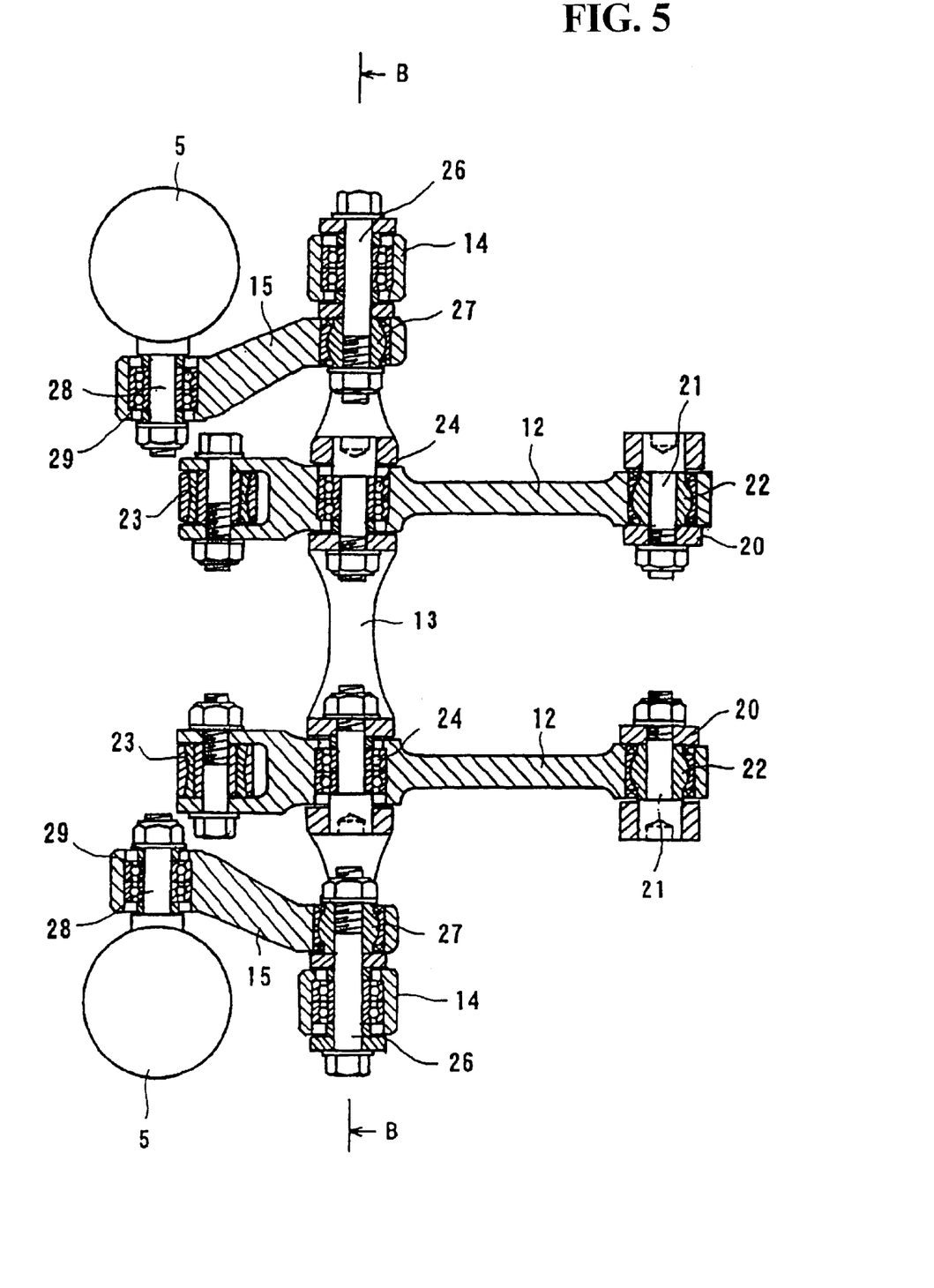
FIG. 5 is an enlarged cross sectional view, looking from direction A—A, of the embodiment shown in FIG. 3.

The embodiment shown in FIG. 3 will be described in detail based on FIG. 5 and FIG. 6. Here, FIG. 5 is an enlarged cross-sectional view looking from the direction A—A of the embodiment shown in FIG. 3, and FIG. 6 is a cross section in direction B—B in FIG. 5, with elements that are the same as in the previous embodiment having the same reference numerals, and description of these elements is omitted.

A bracket 20 is provided on the bottom bridge 4, a rear end of the cushion arm 12 is rotatably linked to this bracket 20 via a bolt 21 and bearing 22, a lower end of the shock absorber 10 is linked to a tip end section of the cushion arm 12 via a bearing 23, and a connecting member 23 is rotatably linked to a middle section of the cushion arm 12 via a ball bearing 24.

Bolts 25 are inserted into both lower ends of the connecting member 13, upper end sections of the push rods 14 are rotatably linked to these bolts 25 via ball bearing 26, one end of each of the upper arms 15 is rotatably linked to common bolts 25 via a bearing 27 while bolts 28 are fixed to side surfaces of the front fork 5, and the other end of each of the upper arms 15 is rotatably linked to these bolts 28 via ball bearings 29.

Figure 6:
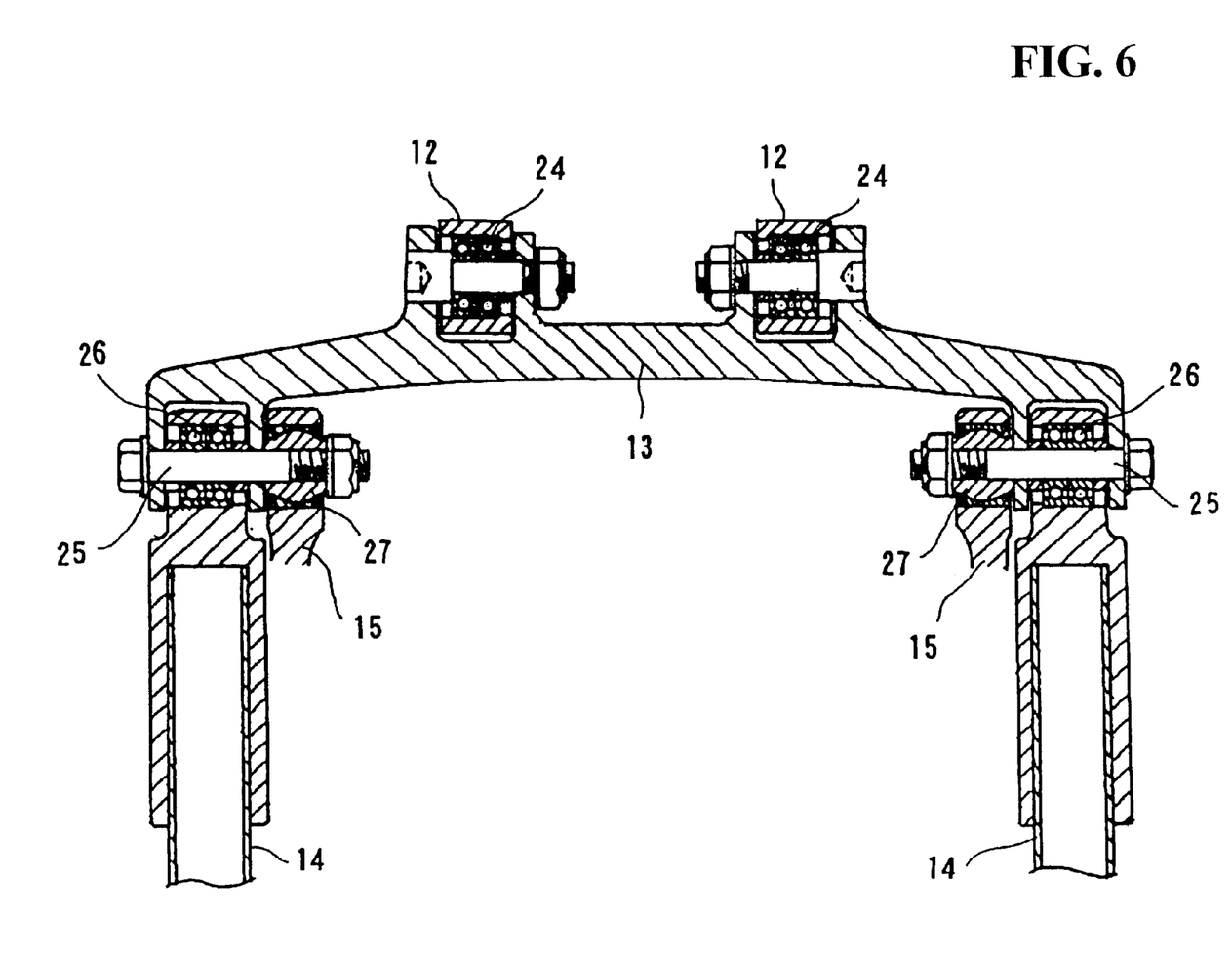
FIG. 6 is a cross sectional view in direction B—B in FIG. 5.

FIG. 7 is a drawing similar to FIG. 6 showing another embodiment, and in this embodiment the connecting member 13 is split into left and right halves 13a and 13b. With this type of arrangement, air flow becomes smooth and a cooling effect is improved.

According to the present invention as described above, a push rod for conveying movement in response to expansion and contraction of a front fork to a shock absorber is substantially parallel to the front fork, which means that a bending moment acting on the push rod is either made extremely small or alleviated altogether, and the push rod requires less rigidity. As a result, it is possible to make the push rod fine and light in weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A link type front suspension structure having a steering stem rotatably attached to a head pipe, a top bridge being provided on an upper end of the steering stem and a bottom bridge provided on a lower end of the steering stem, a front fork supported by the top bridge and bottom bridge, and a lower end of a shock absorber supported by a link mechanism provided on the front fork, wherein the link mechanism is a quadrilateral link mechanism comprising:

an upper link with one end connecting to a middle portion of the front fork;

an axle support arm with one end connecting to a lower end of the front fork and the other end connecting to an axle side of a front wheel;

a push rod having an upper end connecting to the other end of the upper link and a lower end connecting to the axle support arm; and a connecting member having a first end connected to a triangular-shaped cushion arm having a first corner rotatably secured to said lower end of said shock absorber, the connecting member having a second end connected to the upper end of said push rod.

2. The link type front suspension structure according to claim 1, wherein a line connecting a pivot point of the axle support arm push rod and a pivot point of the front fork is substantially parallel to the upper link.

3. The link type front suspension structure according to claim 1, wherein the lower end of said push rod is connected to a central portion of said axle support arm.

4. The link type front suspension structure according to claim 1, wherein said axle support arm is chevron in shape.

5. The link type front suspension structure according to claim 1, wherein said cushion arm has a second corner connected to the upper end of said push rod and a third corner connected to the bottom bridge.

6. The link type front suspension structure according to claim 5, and further including a connecting member for connecting said second corner of said cushion arm to said upper end of said push rod.

7. A link type front suspension structure comprising:

a steering stem adapted to be rotatably mounted relative to a head pipe, said steering stem including a upper end and a lower end;

a top bridge mounted on said upper end of the steering stem;

a bottom bridge mounted on a lower end of the steering stem;

a front fork supported by the top bridge and bottom bridge; and a shock absorber including a lower end supported by a link mechanism provided on the front fork, said link mechanism being a quadrilateral link mechanism comprising:

an upper link with one end connecting to a portion of the front fork;

an axle support arm with one end connecting to a lower end of the front fork and the other end connecting to an axle side of a front wheel;

a push rod having an upper end connecting to the other end of the upper link and a lower end connecting to the axle support arm; and a connecting member having a first end connected to a triangular-shaped cushion arm having a first corner rotatably secured to said lower end of said shock absorber, the connecting member having a second end connected to the upper end of said push rod.

8. The link type front suspension structure according to claim 7, wherein a line connecting a pivot point of the axle support arm push rod and a pivot point of the front fork is substantially parallel to the upper link.

9. The link type front suspension structure according to claim 7, wherein the lower end of said push rod is connected to a central portion of said axle support arm.

10. The link type front suspension structure according to claim 7, wherein said axle support arm is chevron in shape.

11. The link type front suspension structure according to claim 7, wherein said cushion arm has a second corner connected to the upper end of said push rod and a third corner connected to the bottom bridge.

12. The link type front suspension structure according to claim 11, and further including a connecting member for connecting said second corner of said cushion arm to said upper end of said push rod.

* * * * *